United States Patent [19]
Fortenberry et al.

[11] Patent Number: 5,684,586
[45] Date of Patent: Nov. 4, 1997

[54] APPARATUS FOR CHARACTERIZING SHORT OPTICAL PULSES

[75] Inventors: Rance M. Fortenberry; Wayne V. Sorin, both of Mountain View, Calif.

[73] Assignee: Hewlett Packard Company, Palo Alto, Calif.

[21] Appl. No.: 665,148

[22] Filed: Jun. 13, 1996

[51] Int. Cl.$^6$ .................................................. G01B 9/02
[52] U.S. Cl. ........................................ 356/345; 356/349
[58] Field of Search .............................. 356/345, 351, 356/349

[56] References Cited

U.S. PATENT DOCUMENTS

| | | | |
|---|---|---|---|
| 3,679,313 | 7/1972 | Rosenberg | 356/112 |
| 4,588,957 | 5/1986 | Balant et al. | 330/4.3 |
| 4,655,547 | 4/1987 | Heritage et al. | 350/161.12 |
| 4,928,316 | 5/1990 | Heritage et al. | 455/600 |
| 5,359,410 | 10/1994 | Diels et al. | 356/345 |
| 5,453,871 | 9/1995 | Kolner et al. | 359/238 |

OTHER PUBLICATIONS

Delong et al. (1994) "Frequency-Resolved Optical Gating With the Use of Second-Harmonic Generation", Optical Society of America, 11(11), pp. 1–10.

Williams et al. (1994) "Fibre Dispersion Compensation Using A Chirped In-Fibre Bragg Grating", Electronics Letters, 30(12), pp. 985–987.

Wong et al. (1994) "Analysis of Ultrashort Pulse-Shape Measurement Using Linear Interferometers", Optical Society of America 19(4), pp. 287–289.

Goodberlet et al. (1993) "Chirp-Compensated Autocorrelation Of Optical Pulses", Optical Society of America, 18(19), pp. 1648–1650.

Kane et al. (1993) "Characterization of Aribtrary Femtosecond Pulses Using Frequency-Resolved ... ", IEEE Journal of Quantum Electronics, 29(2), pp. 571–579.

Yan et al. (1991) "Amplitude and Phase Recording of Ultrashort Pulses", Optical Society of America,, 8(6), pp. 1259–1263.

Cohen (1989) "Time-Frequency Distributions—A Review", Proceedings of the IEEE, 77(7), pp. 941–981.

Naganuma et al. (1989) "General Method for Ultrashort Light Pulse Chirp Measurement", IEEE Journal of Quantum electronics, 25(6), pp. 1225–1233.

Kolner et al. (1989) "Temporal Imaging With a Time Lens", Optical Society of America, 14(12), pp. 630–632.

Chilla et al. (1991) "Direct Determination of the Amplitude and the Phase ... ", Optical Society of America,, 16(1), pp. 39–41.

Rothenberg et al. (1987) "Measurement of Optical Phase With Subpicosecond ... "Optical Society of America,, 12(2),pp. 91–101.

Martinez (1987) "3000 Times Grating Compressor With Positive Group ... ", IEEE Journal of Quantum Electronics, QE-23(1), 59–64.

Primary Examiner—Frank G. Font
Assistant Examiner—Robert Kim
Attorney, Agent, or Firm—Philip S. Yip

[57] ABSTRACT

An apparatus for characterizing a short optical input pulse is provided. The apparatus has an optical disperser and an analyzer. The optical disperser disperses the input pulse temporally to an extent adequate for the analyzer to analyze. The analyzer analyzes the intensity and phase characteristics of the dispersed pulse which is used to obtain the intensity and phase characteristics of the input pulse. The characteristics of the input pulse are obtained by mathematically back-propagating the dispersed pulse through the disperser. Preferably, the analyzer has a discriminator that splits the dispersed pulse into two portions that travel along two paths of unequal length and then collimating the two portions to obtain optical interference. By analyzing the optical interference, the intensity and the phase of the dispersed pulse can be determined.

20 Claims, 13 Drawing Sheets

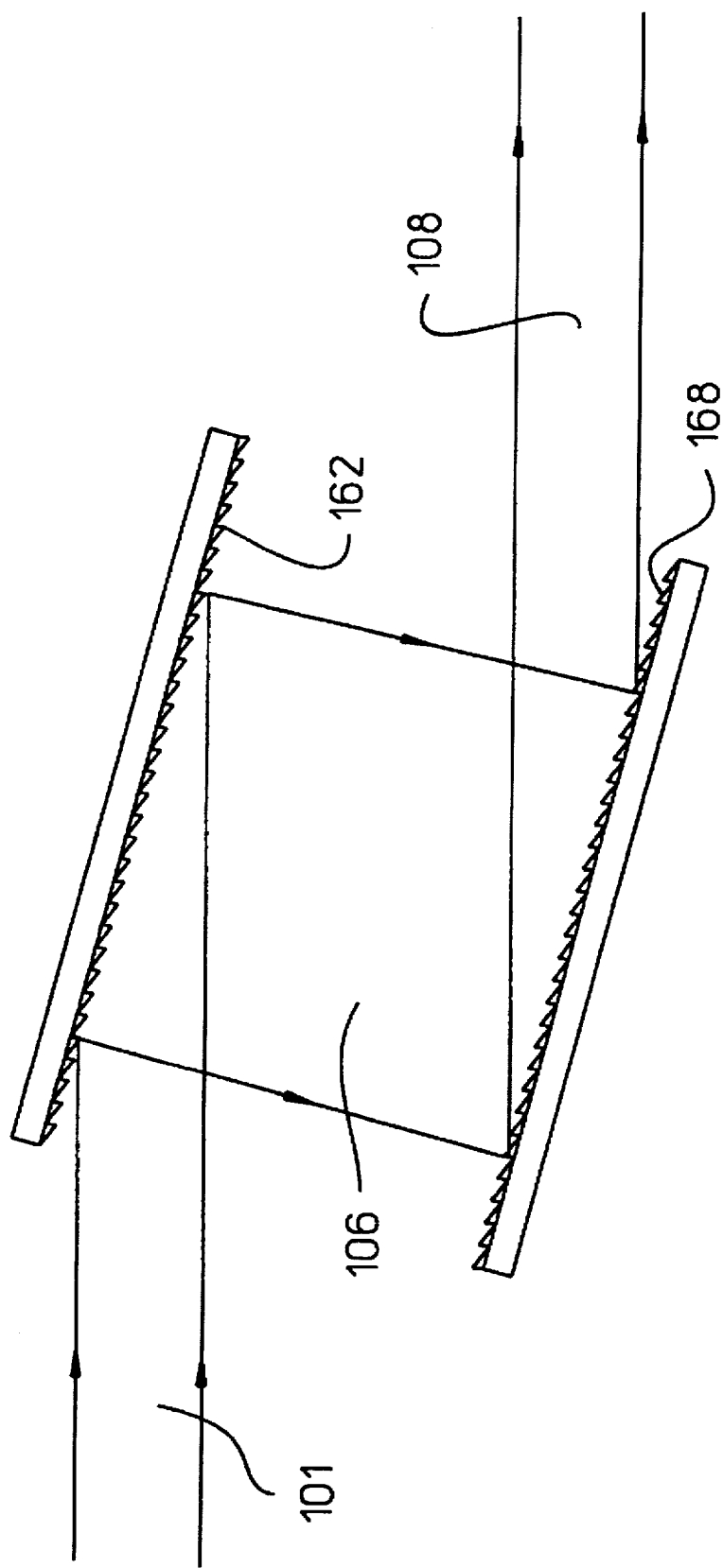

APPARATUS FOR CHARACTERIZING SHORT OPTICAL PULSES

FIELD OF THE INVENTION

The present invention relates to apparatuses and methods for characterizing optical pulses, and more particularly, to characterization of short optical pulses.

BACKGROUND

In optical computing and optical communication systems, higher speed operation often requires the use of shorter optical pulses. Therefore, the characterization of short optical pulses, e.g., in the picosecond and subpicosecond range, is becoming increasingly important. To characterize optical pulses, detectors and measurement devices, such as oscilloscopes, are generally needed. The state of the art electronic detectors and oscilloscopes have impulse responses of about 10 picoseconds (e.g., Hewlett-Packard 54124T 50 GHz oscilloscope and internal PD-10 detector). Such an impulse response limits the accurate characterization of pulsewidths to roughly 40 picoseconds and greater.

Since existing instruments are not able to characterize short optical pulses with a pulsewidth of a few picoseconds or shorter directly, the characterization of such short pulses requires more indirect techniques such as autocorrelation, cross correlation, and spectral techniques such as Frequency-Resolved Optical Gating (FROG) (see, e.g., Kane et al., "Characterization of Arbitrary Femtosecond Pulses Using Frequency-Resolved Optical Gating," *IEEE J. Quantum Electronics*, 29(2):571–579 (1993); K. W. Delong et al., "Frequency-resolved optical gating with the use of second-harmonic generation," *J. Opt. Sec. Am. B*, 11(11), pp. 2206–2215 (1994)). However, each of these techniques has limitations. Autocorrelators do not reveal pulse shapes. Cross-correlators can provide pulse shapes but require a jitter-free source of subpicosecond reference pulses matched in repetition rate to the signal to be measured. Streak cameras are expensive, difficult to use, and are limited to a few picoseconds resolution. FROG is a powerful family of techniques but requires optical nonlinearities and thus high optical powers. Also FROG uses an iterative calculation technique, which currently cannot be implemented in real time.

Rothenberg et al. ("Measurement of optical phase with subpicosecond resolution by time-domain interferometry," *Optical Letters*, 12 (2), (1987)) describe a method of characterizing short optical pulses by interferometric cross correlation. They use an optical filter to obtain a broadened optical pulse of about 10 ps with an increased bandwidth. A portion of this pulse is used to interfere with the unmodified input pulse. Simultaneously, another portion of the broadened pulse is compressed and used as the probe within a cross-correlator to obtain the waveform of the input pulse. Diels et al. (U.S. Pat. No. 5,359,410) also discloses an arrangement for analyzing an optical pulse. In this arrangement, the spectral amplitude of at least one pulse and the phase shifts of portions of the pulse with respect to a non-phase-shifted portion are detected. The input pulse is dispersed into a spectrum and different components of the spectrum are cross-correlated. This introduces significant interference beat-terms that oscillate at 10's of kHz and greater frequencies, making measurement difficult.

The present invention meets the need for an apparatus with relatively simple construction yet is capable of characterizing short optical pulses in real time.

SUMMARY

The present invention provides an apparatus for characterizing a short optical input pulse. The apparatus includes an optical disperser and an analyzer. The optical disperser disperses the input pulse temporally such that the pulse is sufficiently broadened temporally for an analyzer to analyze. The analyzer analyzes the intensity and phase characteristics of the dispersed pulse. By calculating a back-propagation through the optical disperser, the complete optical characteristics of the input pulse can be obtained. Preferably, the analyzer has a discriminator that splits the dispersed pulse into two portions that travel along two paths of unequal length and then combines the two portions to result in an interference pattern. By analyzing the interference pattern, the intensity and the phase characteristics of the dispersed pulse can be determined.

The apparatus and method of the present invention can be advantageously used to characterize short optical pulses, e.g., in the picoseconds and subpicoseconds range. Because the characteristics of the disperser can be known, once the dispersed pulse is analyzed, the characteristics of the input pulse can be calculated. Unlike prior art methods using cross-correlation or autocorrelation, no generation of new frequencies, e.g., higher harmonics, is needed. In fact, in the present invention, it is preferred that the apparatus be linear and the spectrum of the light in the pulse does not change in the apparatus. For this reason, the input pulse does not need to have high intensity to generate light of different frequencies as in the correlation techniques. With the present invention, unlike prior art short pulse analyzers, even pulses with relatively low power and some jitter (noise) can be analyzed. Because the short optical input pulse is temporally broadened, the impulse response constraints on equipment are less restrictive. As a result, less sophisticated equipment can be used to analyze the short input pulse than in prior art methods. Using the technique of the present invention, the complete characterization of short optical pulses can be achieved rapidly in real time without extensive, interactive, iterative computation.

BRIEF DESCRIPTION OF THE DRAWING

The following figures, which show the embodiments of the present invention, are included to better illustrate the apparatus and technique of the present invention. In these figures, like numerals represent like features in the several views.

FIG. 4 shows yet another embodiment of the disperser of the pulse-characterizing apparatus of the present invention.

FIG. 5 shows an embodiment of the discriminator of the pulse-characterizing apparatus of the present invention.

DETAILED DESCRIPTION OF THE INVENTION

The pulse-characterizing technique of the present invention involves dispersing a short optical input pulse temporally to obtain a pulsewidth sufficiently broad to be analyzed by an analyzer, analyzing the intensity and phase properties of the dispersed pulse, and then calculating the back-propagation of the dispersed pulse through the disperser to obtain the characteristics of the input pulse. In a preferred embodiment, the intensity and phase properties of the dispersed pulse are analyzed by splitting the dispersed pulse into two portions on two paths and then collimating the two portions to result in optical interference. Analysis of the interference pattern provides information about the optical characteristics of the dispersed pulse. This information can be used to calculate a back-propagation through the disperser. The result of the back-propagation provides the characteristics of the short optical input pulse.

Figure 1:
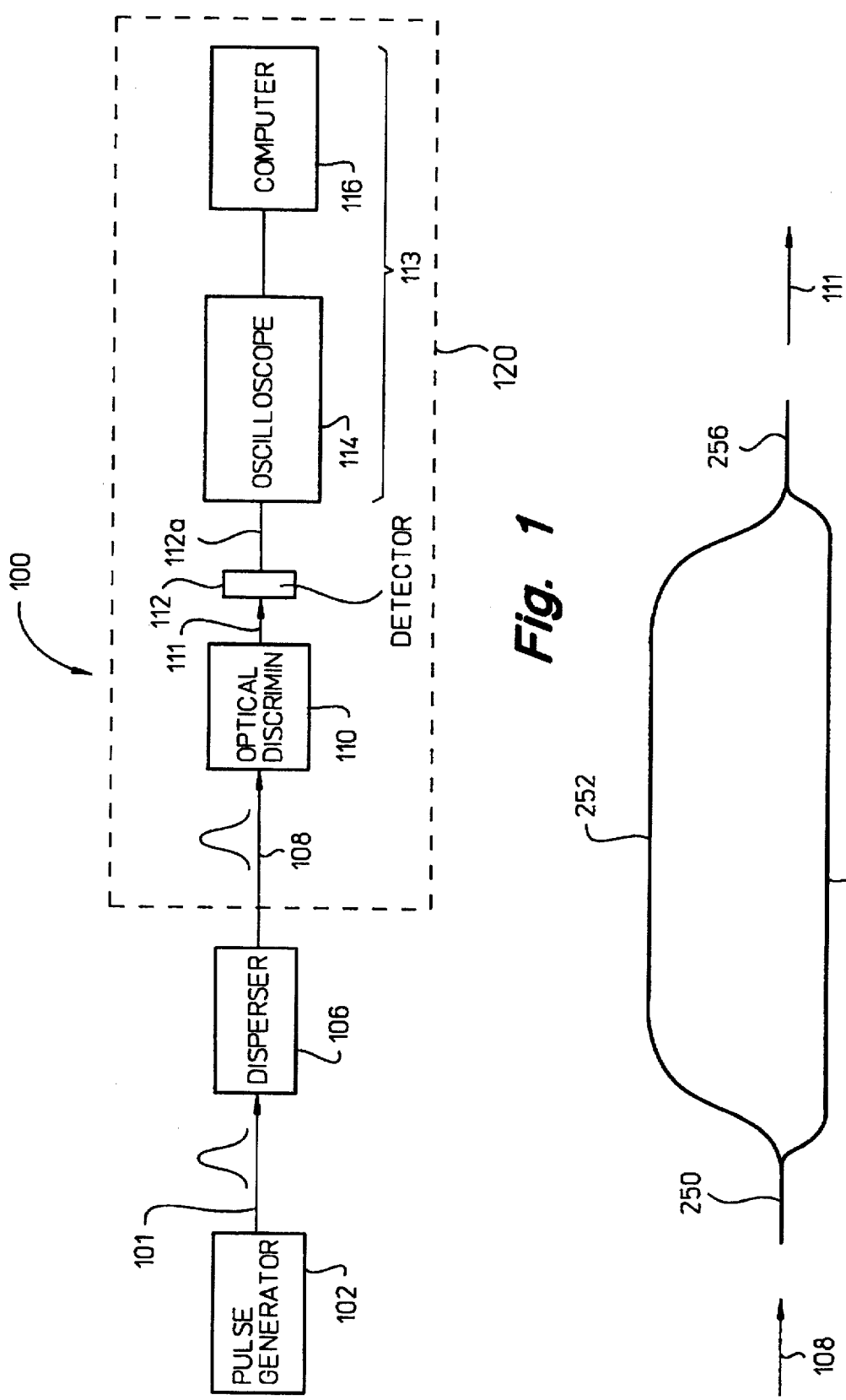
FIG. 1 shows a schematic representation of the pulse-characterizing apparatus of the present invention.

FIG. 1 shows the pulse-characterizing apparatus 100 of the present invention. As shown in FIG. 1, a short optical input pulse 101 is directed toward the pulse-characterizing apparatus 100. Such a short optical input pulse may come from an optical pulse generator (not shown in the figure) whose characteristics are not known. A disperser 106 in the apparatus 100 disperses the input pulse 101 temporally. This results in a temporally broadened pulse 108 (hereinafter referred to as the "dispersed pulse") that is wider in time than the input pulse. This pulse is also called a chirped (i.e., frequency swept) pulse because the frequency in the pulse changes with time.

The dispersed pulse 108 coming from the disperser 106 is then analyzed by an analyzer 120. In the analyzer 120, the dispersed pulse 108 impinges on an optical discriminator 110, which analyzes the phase characteristics of the dispersed pulse. Radiation 111, e.g., light of a interference pattern between two portions derived from the dispersed pulse, resulting from the discriminating activity of the discriminator 110, is detected by a detector 112, which transforms the radiation 111 into electrical signals 112A. The electrical signals 112A are analyzed by an electrical-signal-processor 113, which analyzes the electrical signals 112A from the detector 112 to obtain the phase characteristics of the dispersed pulse. The analyzer also calculates the back propagation of the dispersed pulse through the disperser 106. The electrical signal processor 113 can include a signal collection-display device 114, such as an oscilloscope, and an information processor 116. The information processor 116 can be a computer, including, for example, a digital computer, a microprocessor, a neural network processor, or the like. It is understood that the electrical-signal-processor 113 and information processor 116 can be interfaced with other systems for downstream operations, such as the display of information, transfer of data and analysis results, control of other electronic components, and the like. Devices and techniques for such interfacing and downstream operations are known in the art.

Disperser

Figure 2:
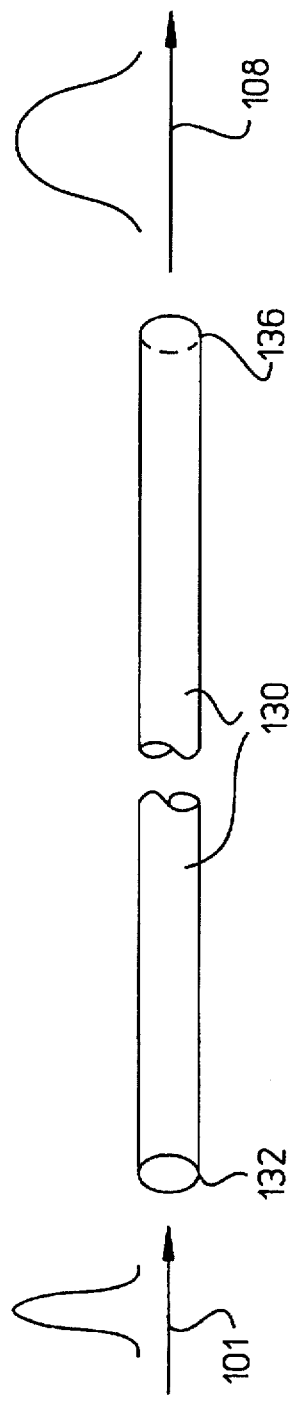
FIG. 2 shows an embodiment of the disperser of the pulse-characterizing apparatus of the present invention.

Any disperser that can produce a dispersed pulse broad enough, i.e., with a long enough duration, to be analyzed by the analyzer can be used in the apparatus of the present invention. As used herein, a "dispersed" pulse refers to a pulse that is temporally broadened. A preferred method of dispersing a short optical pulse is to pass it through a material with different refractive indices for different wavelengths. Since light of different wavelengths propagates in the material at different velocities, the input pulse is dispersed temporally. FIG. 2 shows an optical fiber 130, which can act as a disperser. To simplify the back-propagation calculation, it is preferred that the dispersion be linear (i.e., no significant intensity-dependent change in refraction index) and the dispersion should be accurately known. With a linear disperser, no new frequencies are generated in the dispersion. The input pulse 101 enters one end 132 and exits another end 136 of the optical fiber 130 as a dispersed pulse 108. The characteristics of the disperser can be described mathematically with a transfer function, which conventionally is represented by H(ν), where ν is frequency. The input pulse having an electric field characteristics of $E_{in}(t)$ exits the disperser 130 as a pulse with characteristics $E_{disp}(t)$, where t is time. Since currently available detectors and oscilloscopes are not able to detect very short pulses, the degree of temporal broadening is chosen, through the selection of the length and refractive index characteristics of the optical fiber, to enable the discriminator 110 to analyze the dispersed pulse 108 using currently available detectors.

Figure 3:
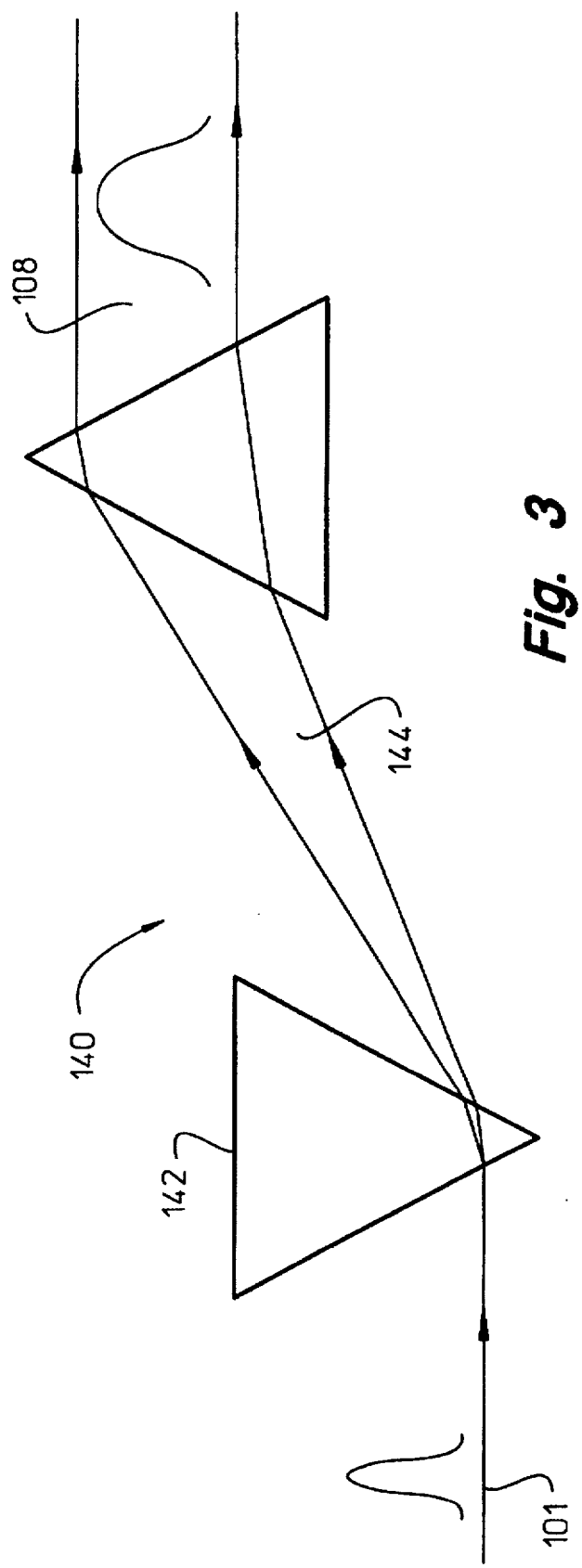
FIG. 3 shows another embodiment of the disperser of the pulse-characterizing apparatus of the present invention.

One alternative embodiment of the disperser 106 is a prism system 140 shown in FIG. 3. In this disperser, the input pulse 101 passes through a first prism 142, which refracts components of different wavelengths of the input pulse differently, resulting in a spread beam 144. The spread beam 144 is passed through a second prism 146 arranged in such a way to collimate the spread beam 144. The refractive indices of the prisms are selected such that light of different wavelengths (i.e., different frequencies) passes through the prisms with different velocities to result in sufficient temporal broadening of the input pulse for the discriminator to analyze. It is to be understood that other devices that are capable of allowing different frequency components of the input pulse to pass at different velocities can be used as a disperser. Such devices can contain solid, liquid, or gaseous materials.

Yet another embodiment of a disperser is shown in FIG. 4. The input pulse 101 impinges on a first diffraction grating 162, which fans out the components of different frequencies, resulting in a wider diffracted beam 166. The diffracted beam 166 impinges on a second diffraction grating 168 which redirects the diffracted beam 166 back to a collimated beam 108 suitable to be processed by the analyzer 120. The components of different frequencies traverse through different path lengths, thus resulting in a temporally broadened pulse. Since gratings can separate wavelengths that are distributed continuously, the characteristics and positioning of the two diffraction gratings are selected such that the resulting dispersed pulse 108 is broadened temporally to a degree appropriate for the discriminator to analyze. To the sake of clarity, FIG. 4 shows only the beam 166A resulting from the highest frequency and the beam 166B resulting from the lowest frequency in the dispersed pulse spectrum as a result of diffraction. FIG. 4 does not illustrate with specificity the diffraction of many different frequencies, which would have to be represented by many slightly separated lines.

Analyzer

The discriminator 110 of the present invention, which analyzes the intensity and phase characteristics of the dispersed pulse 108, is capable of optically transforming the dispersed pulse into a form that permits the phase characteristics of the pulse to be determined. FIG. 5 shows an embodiment of such a discriminator that can allow the phase characteristics to be determined based on intensity measurements. In FIG. 5, the discriminator 110 includes optical fibers. The dispersed pulse 108 enters an optical fiber 250, which branches into two branches 252, 254 of different path length. Thus, the dispersed pulse 108, as it encounters the branches 252, 254, is divided into two portions. Further down along the paths traversed by the two portions of the split pulse, these two branches 252, 254 converge into a single fiber 256, thus combining the two portions of the split pulse into a combined pulse. Because of the difference in path length traversed by the two portions of the split pulse, optical phase information can be obtained from the interference pattern of the combined pulse, which results in the radiation 111 (see FIGS. 1 and 5) in this embodiment. The radiation 111 of the combined pulse impinges on the detector 112, for example, a photodiode. Signals resulting in the detector can then be collected and subsequently analyzed by the information processor 116, e.g., a computer, to determine the phase and intensity characteristics of the dispersed pulse and to calculate the back-propagation of a pulse with these characteristics through the disperser to obtain the characteristics of the input pulse. As previously indicated, for this technique to work well, the dispersion of the input pulse is selected to be sufficient for the dispersed pulse to be detectable by the detector 112. The dispersed pulse preferably has a pulsewidth of greater than about 10 ps, more preferably greater than 40 ps.

Figure 6:
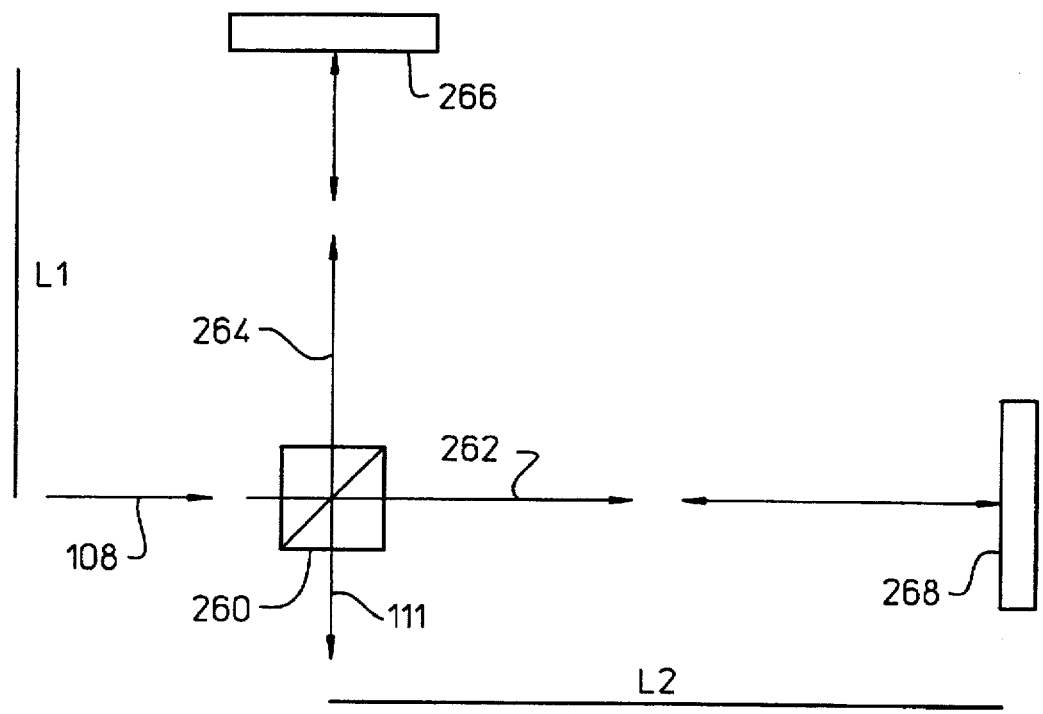
FIG. 6 shows another embodiment of the discriminator of the pulse-characterizing apparatus of the present invention.

FIG. 6 shows another embodiment of a discriminator. In this case, the dispersed pulse 108 impinges on a beam splitter 260, which splits the optical pulse into two portions 262, 264. One portion 262 is directed to and is reflected back from a first mirror 266 to the beam splitter 260. The other portion 262 is directed to and is reflected back from a second mirror 268 to the beam splitter 260. The distance, L1, from the beam splitter 260 to the first mirror 266 is different from the distance, L2, from the beam splitter to the second mirror 268. At the beam splitter 260, the pulse that has been reflected by the second mirror 268 is reflected and directed to travel on the same path as the pulse that has been reflected by the first mirror 266. This results in a combined pulse 111, which exhibits optical interference.

Figure 7:
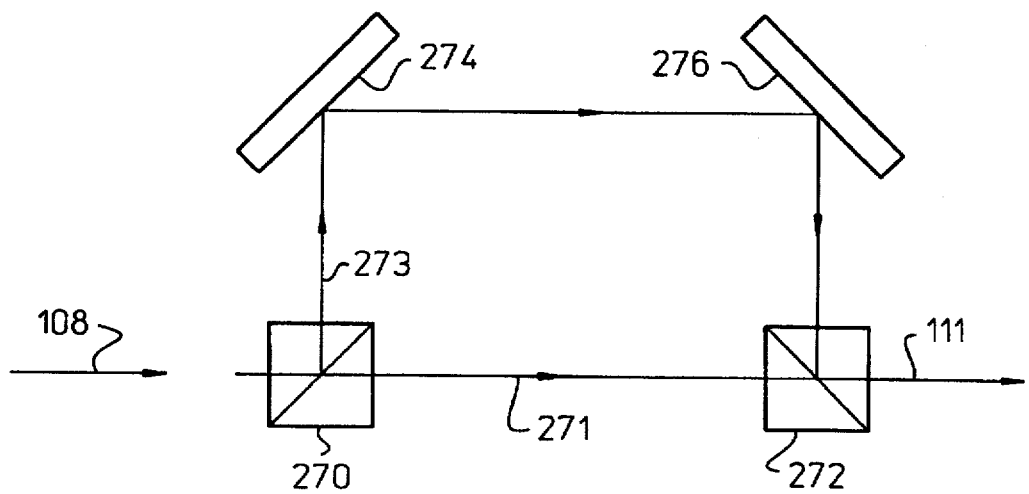
FIG. 7 shows yet another embodiment of the discriminator of the pulse-characterizing apparatus of the present invention.

Yet another embodiment of a discriminator is shown in FIG. 7. In this embodiment, the dispersed pulse 108 impinges on a beam splitter 270 and is split. One portion 271 of the pulse travels to a half mirror 272. Another portion 273 of the pulse is directed to a first mirror 274 and then to a second mirror 276 before directed to the half mirror 272 to combine with the portion 271 to result in the combined pulse 111. Thus, the dispersed pulse 108 is split into two portions that travel through paths of unequal length and collimate, or recombine, to result in optical interference. Such discriminators that split the dispersed pulse onto paths of unequal length are called "delay line discriminators" because of the delay of the pulse on the longer path over the shorter path. With the above discriminators, one can measure the intensities, Ia(t), Ib(t) of the two portions of the dispersed pulse, and the intensity of the interference pattern If(t) and then calculate the phase characteristics of the dispersed pulse.

Figure 8A:
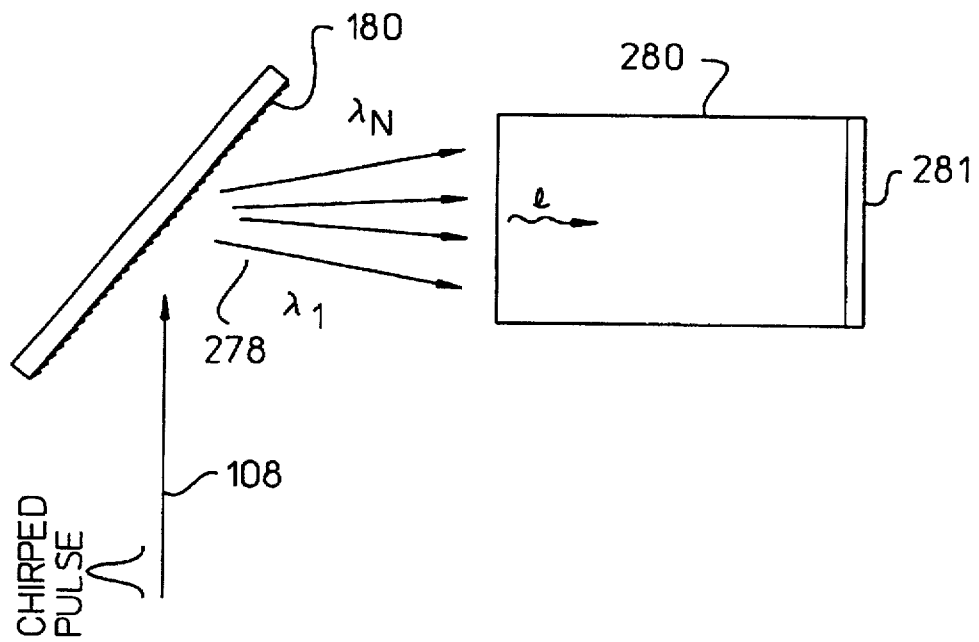
FIG. 8A shows an embodiment of the discriminator having a streak camera in a pulse-characterizing apparatus of the present invention.

In another embodiment of the analyzer, a portion of which is shown in FIG. 8A, the dispersed pulse 108 is diffracted by a diffraction grating 180, which spreads spatially the components of different wavelengths ($\lambda$'s) to result in a spread pulse 278. The spread pulse 278 impinges on a streak camera 280, which emits electrons as a function of the intensity of light entering it. A time-varied electric field is applied in a direction perpendicular to the path of the electrons, e.g., into the page in FIG. 8A. A 2-dimensional electron imager or detector 281 at the end of the streak camera opposite to the light inlet end images the electrons emitted and transforms the light entering the streak camera into electrical signals. The time-varied electric field can have, for example, a ramped variation in amplitude. This causes the electrons that pass through the streak camera over time to be detected at different locations in the imager 281, forming an image 279. Therefore, the 2-dimensional electron imager 281 can show the relationship between the wavelengths ($\lambda_1, \lambda_2, \ldots \lambda_N$) and the intensities of the components of the diffracted pulse as a function of time, thus providing a spectrogram. The disperser disperses the input pulse to a pulsewidth sufficiently broad to be analyzed by the streak camera, i.e., to more than about 5 ps, preferably to 10 ps or more.

Figure 8B:
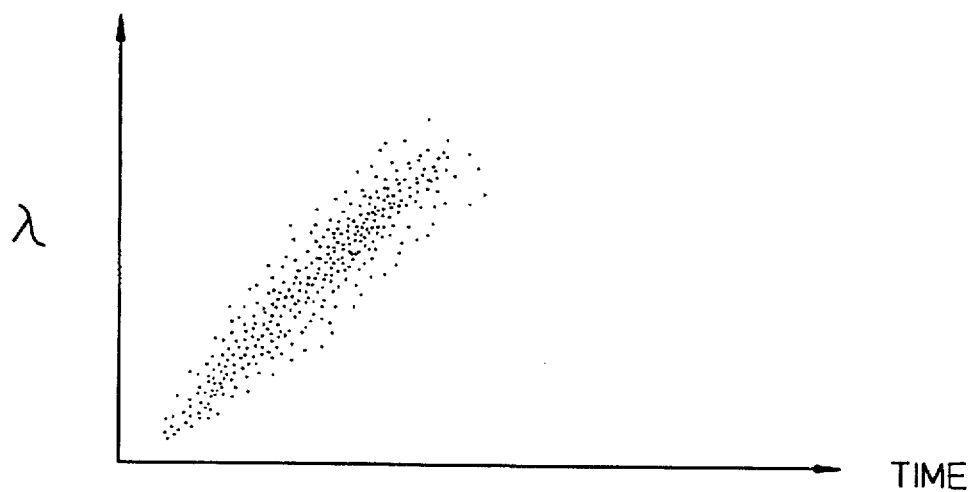
FIG. 8B shows an example of a 2-dimensional image obtained by a detector receiving electrons from the streak camera of FIG. 8A.

The density at a location on the image 279 indicates the intensity of the light corresponding to a particular time in the dispersed pulse. FIG. 8B shows a schematic example of such a spectrogram. The intensity pattern in such data can be analyzed to obtain the power of the pulse at each wavelength. The electrical signals can be analyzed, for example, by a computer to obtain the intensity and phase characteristics of the dispersed pulse. Methods of analyzing a spectrogram to obtain phase information of a pulse are known in the art. For example, the method of analyzing spectrograms in the above-mentioned FROG technique by Kane et al. can be used to analyze spectrograms such as one similar to FIG. 8B. The Kane et al. description on the analysis of spectrogram is incorporated by reference herein. Once the characteristics of the dispersed pulse are calculated, the dispersed pulse can be back-propagated mathematically through the disperser 106 to obtain the characteristics of the input pulse.

Figure 8C:
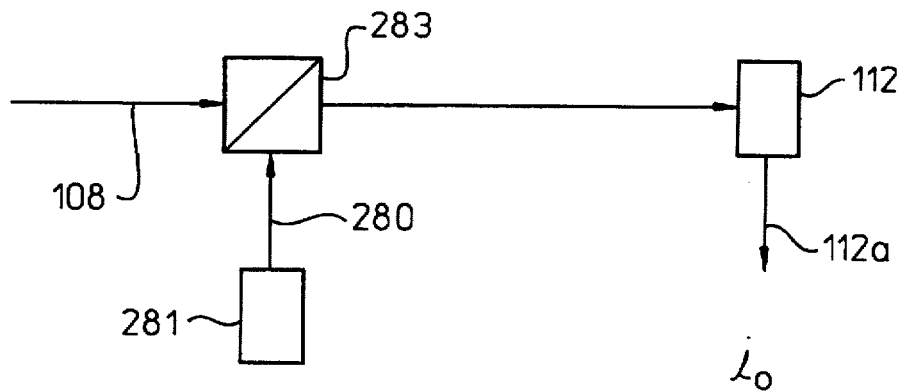
FIG. 8C shows another embodiment of a discriminator according to the present invention.

Other appropriate devices for measuring the amplitude and phase of the dispersed optical pulse can be used as a discriminator. For example, another method for determining the phase of the dispersed pulse is using optical heterodyne detection. FIG. 8C illustrates an embodiment of such a discriminator. Discriminator 110 includes a light source (laser) 281 that emits a secondary beam 282 of a continuous wave oscillation (at a single frequency, e.g., at $v_o$). This secondary beam 282 and a beam of dispersed pulse 108 having frequencies centered around, e.g., $v_r$, impinge on a high speed detector 112 to result in electrical signals 112A. A beam splitter 283 can be used to reflect or direct the secondary beam 282 and beam 108 to the detector 112. Electrical signals 112A can then analyzed by an electrical-signal-processor, which can include a computer, an oscilloscope, and the like.

Figure 8D:
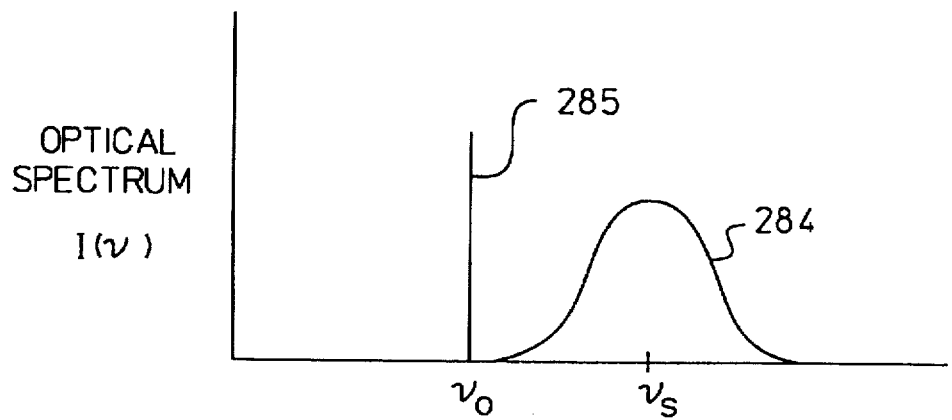
FIG. 8D illustrates the optical spectra of the input light pulse and the secondary beam 280 in FIG. 8C.
Figure 8E:
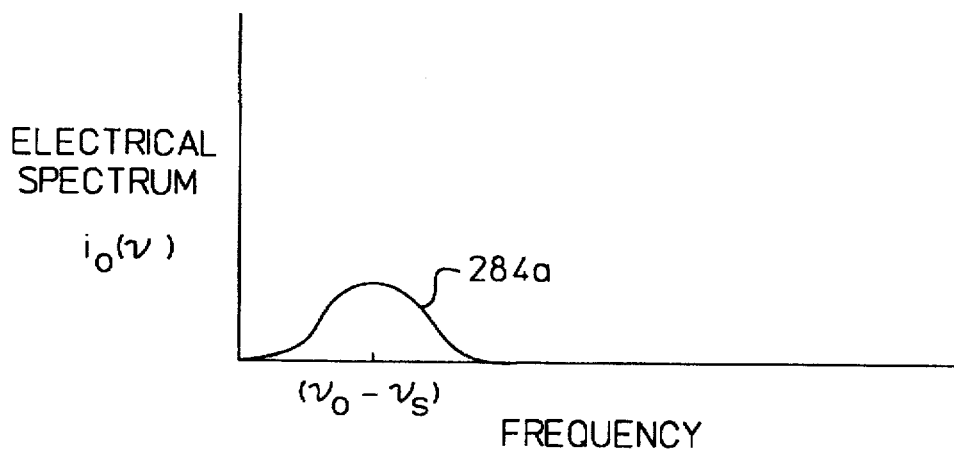
FIG. 8E illustrates the electrical spectrum of the electrical output from the detector 112 in FIG. 8C.

At the detector 112 in FIG. 8C, the interaction of the beams 108 and 282 results in beats in a way similar to the interference of the two portions of the dispersed pulse that had been split between the two paths in the example of FIG. 6 and FIG. 9 (shown below). FIG. 8D shows the optical spectra of the two beams 108 and 282. Curve 284 represents the distribution of intensity versus frequency of the beam of dispersed pulse 108 and line 285 represents the intensity of the beam of the secondary beam 282 when each beam impinges on the detector. In FIG. 8E the curve 284A shows the spectrum of the electrical signal generated in response to combining the beam 108 and secondary beam 282. It is noted that the intensity of the electrical signals is distributed around the frequency value $(v_s-v_o)$. Based on the electrical signals 112A, the phase and amplitude characteristics of the dispersed pulse in beam 108 can be determined by a person skilled in the art in a way similar to the method described below, as in the embodiment of FIG. 6, for splitting a dispersed pulse into two portions. The amplitude (i.e., intensity) of the beam of the dispersed pulse 108 and the amplitude of the secondary beam 282 can be determined by blocking the two beams one at a time.

Analysis for Phase Characteristics of the Input Pulse Using a Discriminator with Paths of Unequal Length In the present invention, to characterize an optical input pulse, the input pulse is dispersed, and the intensity and phase characteristics of the dispersed pulse are analyzed, then the intensity and phase information on the input pulse is calculated based on back-propagation of the dispersed pulse through the disperser. Since an optical pulse can be described by an equation that describes its electric field, the present method of characterization of the input pulse involves finding the electric field of the dispersed pulse and back-propagating it through the disperser. To find the phase characteristics of the dispersed pulse, a relationship between the phase characteristics of the dispersed pulse and some easily measured data should first be established. In the case in which the dispersed pulse is split into two portions, the easily measured data are the intensity data of the interference pattern and in the two portions.

Mathematically, the electric field of the dispersed pulse can be represented as a function of time as $$E_{disp}(t)=A(t)\exp\{j(\omega_o t+\phi(t))\} \quad \text{Eq. (1)}$$

where t is time, A(t) is the amplitude of the electric field of the dispersed pulse, $\omega_o$ is a constant angular velocity based on the frequency of the dispersed pulse, $\phi(t)$ is the phase of the disperse pulse, and j is the square root of negative 1, i.e., $(-1)^{0.5}$.

In a discriminator, e.g., in FIG. 5, 6, or 7, in which the dispersed pulse is split onto two paths, (a) and (b), of different path length and then collimated, the intensity, If(t), of the interference pattern is $$If(t)=|E_{disp}(t)+E_{disp}(t+\tau)|^2 \quad \text{Eq. (2)}$$

where $\tau$ is the time delay difference between the long and the shorter paths. Since $$E_{disp}(t+\tau)=A(t+\tau)\exp\{j(\omega_o(t+\tau)+\phi(t+\tau))\} \quad \text{Eq. (3)}$$

expanding If(t) in terms of the intensities, Ia(t) and Ib(t), of the (a) and (b) portions results in the following:

$$If(t)=Ia(t)+Ib(t)+2\sqrt{Ia(t)\cdot Ib(t)}\cos(\Delta\phi(t)+\phi_o) \quad \text{Eq. (4)}$$

where $\Delta\phi(t)$ is the phase difference between portion (a) and portion (b) at time t, and $\phi_o$ is a constant.

To obtain the phase at time t in the dispersed pulse relative to t=0, $\Delta\phi(t)$ can be integrated $$\phi(t)=(1/t)\int_o^t \Delta\phi(t')dt' \quad \text{Eq. (5)}$$

where t' is an arbitrary time unit for the integration of time from 0 to t. Thus, a relationship is established between Ia(t), Ib(t), and $\phi(t)$. The intensity of each portion of the dispersed pulse can be determined by blocking one path of the discriminator. If desired, the intensity of the dispersed pulse can be measured directly. In this way, the electric field of the dispersed pulse can be represented by $E_{disp}(t)$ in the time domain. The corresponding electric field in the frequency domain, $E_{disp}(v)$, can then be calculated.

Knowing the characteristics of the disperser, which has a transfer function in the frequency domain of H(v), the electric field of the input pulse can be determined by calculating a back-propagation of the dispersed pulse through the disperser:

$$E_{in}(v)=H^{-1}(v)\cdot E_{disp}(v) \quad \text{Eq. (6).}$$

Taking the inverse Fourier transform, which is represented by $F^{-1}$, the electric field of the input pulse in the time domain is $$E_{in}(t)=F^{-1}\{E_{in}(v)\} \quad \text{Eq. (7).}$$

Computation with Numerical Data

In real-life implementation of the above method of the analysis of phase information, numerical intensity data are collected at discrete intervals of time. Methods of discrete data collection and calculation to approximate continuous waveforms are known in the art. To facilitate the understanding of the present invention, an illustrative example is briefly described below. In this example, the input pulse was passed through a disperser and the dispersed pulse was split into two portions onto two paths of unequal length (shown in FIG. 6) to result in optical interference. Three sets of intensity data were taken at discrete intervals of time: the intensity of the two portions, $Ia_i$ and $Ib_i$, as well as the intensity of the resulting interference pattern, $If_i$, where i is the data point number related to time. The intensity of each of the split portions of the pulse can be measured directly without interference taking place (e.g., by blocking one of the split portions, leaving the other split portion to travel down the path).

Based on the intensities of the interference pattern, $If_i$, the signal of the first portion of the split pulse (e.g., arbitrarily designated as portion (a)), and the signal of the second portion (e.g., arbitrarily designated as portion (b)), the phase relationship between the portions is given by $$\cos\Delta\phi_i=\{If_i-Ia_i-Ib_i\}/\{2\sqrt{Ia_i\cdot Ib_i}\} \quad \text{Eq. (8)}$$

where $\Delta\phi_i$ is the phase of the intensity fringes of the interference pattern seen by a detector. This corresponds to Eq. (4). In Eq. (8), $If_i$, $Ia_i$, and $Ib_i$, which are in discrete-numerical form, correspond to If(t), Ia(t), and Ib(t) of Eq. (4).

It may appear that $\Delta\phi_i$ can be determined by directly substituting values of $If_i$, $Ia_i$, and $Ib_i$ into Eq. (8) and taking the arccosine of the right side of the equation. However, because many of the $Ia_i$ and $Ib_i$ data are about zero, the resulting cos $\Delta\phi_i$ often have indefinite values. One practical method equivalent to finding the arccosine in Eq. (8) to find $\Delta\phi_i$ from data points is by curve-fitting to interpolate between data points to determine the frequency at zero-crossings and for the data points on the curve of cos $\Delta\phi_i$. The summation in radian of the number of cycles from time zero to a specific time i gives $\Delta\phi_i$. Methods for finding instantaneous frequencies at points along a time-based curve are known in the art. For example, a way to find the frequencies at the data points is by using an analytic function method through interpolation between the data points (see "Time-Frequency Distributions—A Review" by Leon Cohen, Proceedings of IEEE Vol. 77 No. 7, July 1989, which method is incorporated by reference herein).

After obtaining the frequencies at the data points of cos $\Delta\phi_i$, the following equations convert these frequencies into their corresponding optical phase:

$$\Delta\phi_i = 2\pi \sum_{p=0}^{i} v_p \cdot \Delta t \qquad \text{Eq. (9)}$$

and $$\phi_i = 2\pi \sum_{p=0}^{i} \{(\Delta\phi_i)_p/\tau\} \cdot \Delta t \qquad \text{Eq. (10)}$$

where $v_p$ is the frequency at data point p, $\Delta t$ is the time between sample points, $\tau$ is the delay between the two portions of the split pulse, and $\phi_i$ is the phase of the dispersed pulse at point i. Eq. (10) is a discrete numerical equivalent of Eq. (5). In this way, the phase of the dispersed pulse can be completely characterized. It is understood that although a summation method based on discrete numerical points is used for phase calculations, such summation is only one way to approximate the mathematics of integration, and it is contemplated that other electronic methods can be used for calculating integration.

From the intensity and phase information of each of the data points, the dispersed pulse can be mathematically back-propagated to obtain the input pulse. This can be done by first determining the electric field of the dispersed pulse. The phase characteristics of the dispersed pulse and that of the pulse in portion (a) are the same. Since the intensity of the dispersed pulse differs from that of the pulse in portion (a) by only a constant factor and the shape of the pulse in portion (a) is known, the electric field of the dispersed pulse is easily determined. If desired, the intensity of the dispersed pulse can be measured directly by the detector. In fact, in the characterization of a pulse, once the shape of the pulse is known, the absolute value of the intensity is not important. The electric field of the portion (a) as a function of time, i, is $$E_{disp}(i) = \{I_{disp}(i)\}^{1/2} \exp\{j \cdot (\omega_o i + \phi(i))\} \qquad \text{Eq. (11)}$$

where $\phi_i$ is the phase at time i and $\omega_o$ is a constant. The optical intensity of the dispersed pulse is then, $$I_{disp}(i) = |E_{disp}(i)|^2 \qquad \text{Eq. (12)}.$$

By taking the Fourier transform of $E_{disp}(i)$, the pulse in the frequency domain can be obtained as $E_{disp}(v) = F\{E_{disp}(i)\}$. Knowing the dispersion characteristics of the disperser, the back-propagation of the dispersed pulse through the disperser can then be calculated. The transfer function of the disperser can be represented by $H(v) = e^{-jD(v)}$, where $D(v)$ is the dispersion of the disperser as a function of frequency v. The time domain electric field, $E_{in}(t)$ of the input pulse is obtained by multiplying $E_{disp}(v)$ with the reciprocal of the transfer function $H(v)$ in the frequency domain and taking the inverse Fourier transform to convert to the time domain, as described above in Eq. (6) and Eq. (7). The value of $\omega_o$ in Eq. (1) related to the central frequency of the dispersed pulse can be determined by spectrographs or similar frequency measuring devices known in the art.

EXAMPLE

Figure 9:
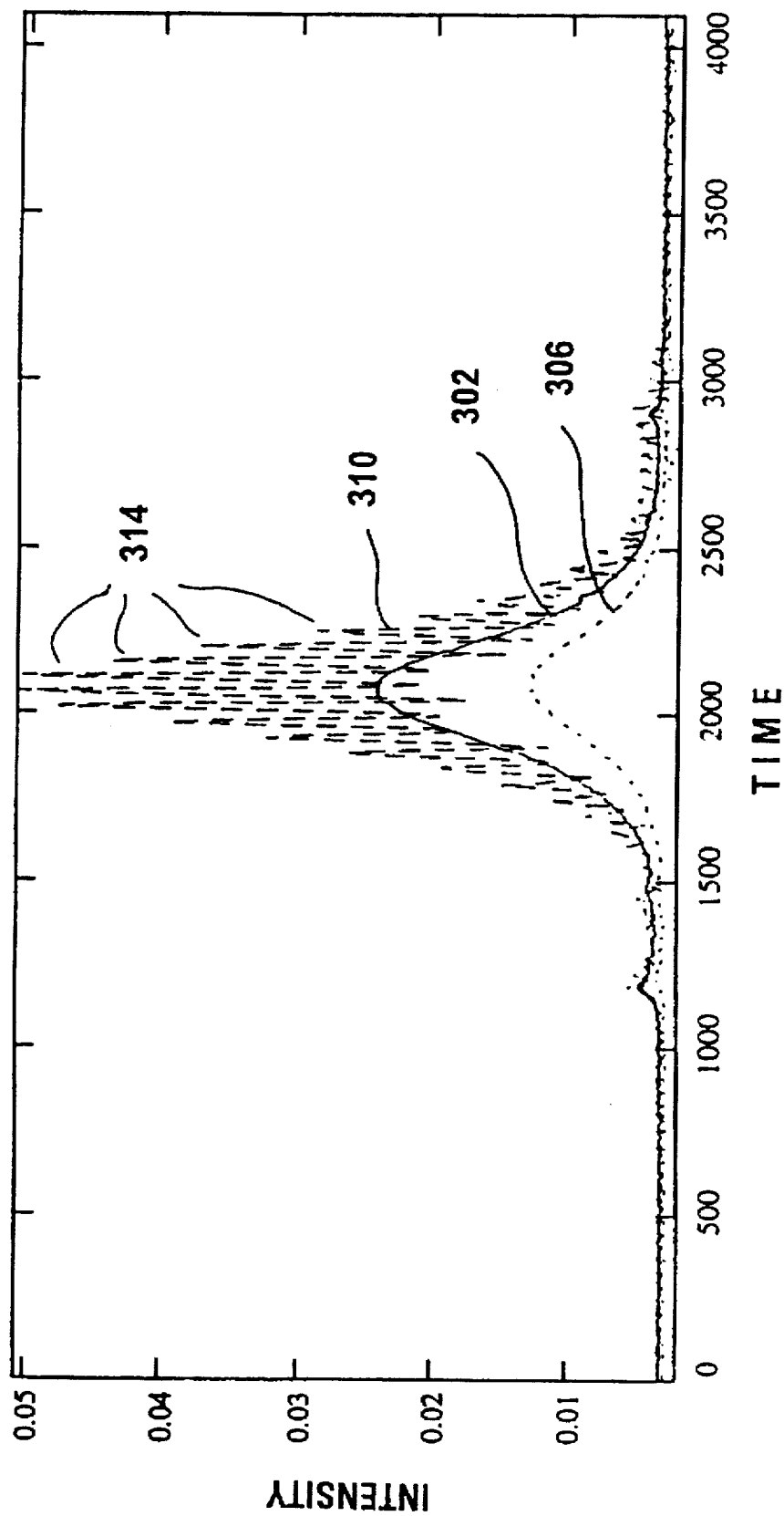
FIG. 9 shows the optical interference as a result of an optical pulse passing through a disperser and discriminator with the dispersed pulse split between two paths in an example according to the present invention.

FIG. 9 illustrates the intensity data obtained by a detector that measured light intensity at the exit end of a discriminator having two paths as shown in FIG. 6. The optical input pulse is first passed through a disperser before passing through the discriminator. To facilitate the evaluation of the present technique, an input pulse with a known full width half maximum intensity of 0.6 ps width at a 1550 nm wave length was used, although unknown input pulses of other shapes and pulsewidth can be characterized with the present technique. The disperser was an optical fiber (Corning SMF-28) approximately 6 km long. A discriminator similar to that of FIG. 6 can also be made, for example, by collimating the output of two optical fibers using a commercially available branched coupler, or by using optical fibers and beam splitter cubes, with the beam splitting and converging by an arrangement similar to that of FIG. 7 above. A Hewlett-Packard 54124T 50 GHz oscilloscope with an a PD-10 detector was used as the detector 112 to measure the intensity of light 111 exiting the fiber optics discriminator 110, as shown in FIG. 1. Curve 302 in FIG. 9 represents the intensity, $Ia_i$, of portion (a) of the split pulse. Curve 306 represents the intensity, $Ib_i$, of portion (b) of the split pulse. Curve 310 represents the optical interference signals, having peaks 314. However, it is not necessary that the two portions be different in intensity for the present invention to be work. In FIGS. 9, 12, 13, and 15, the intensity data are shown in arbitrary units.

Figure 10:
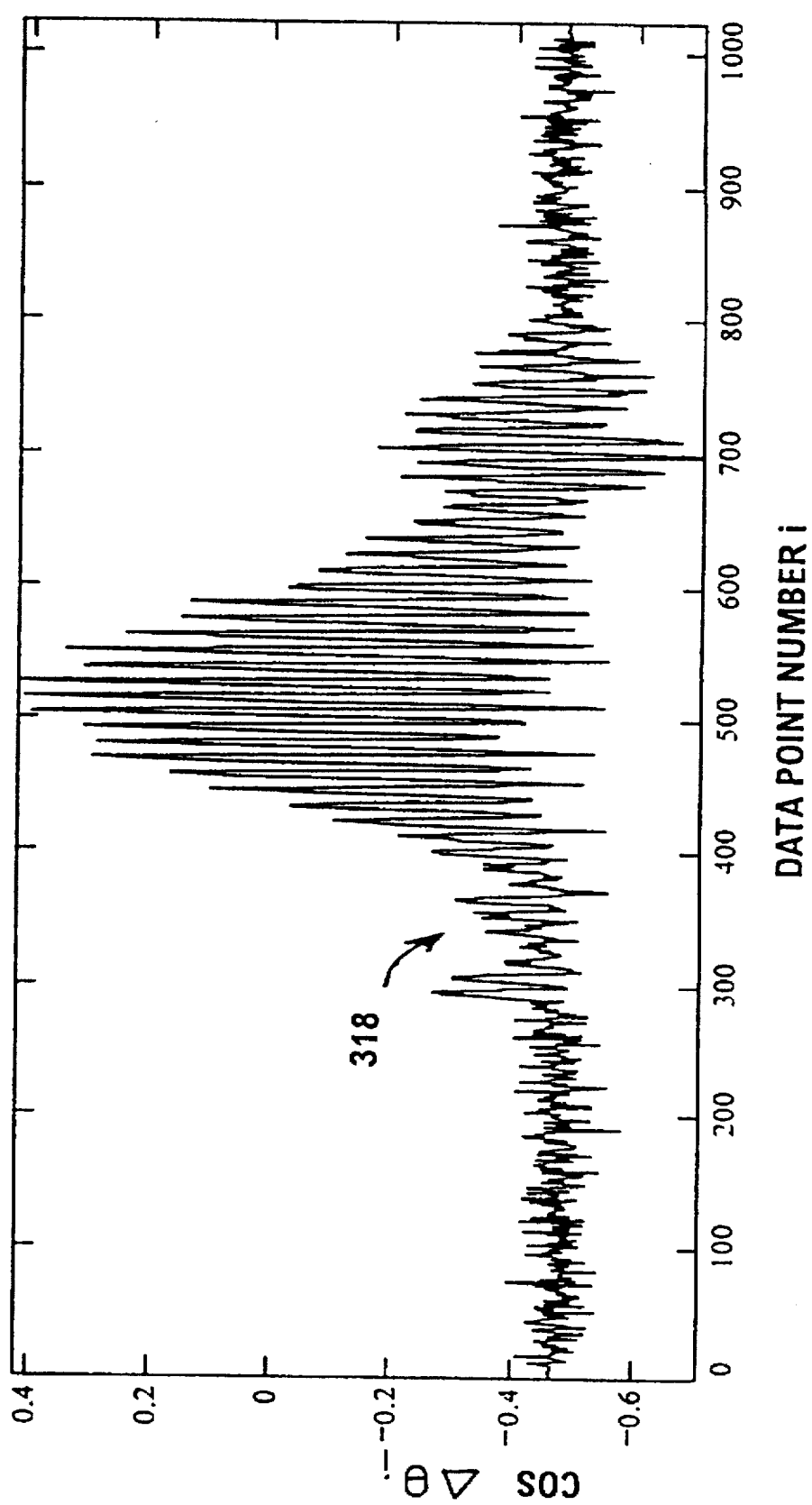
FIG. 10 shows the cosine functions relating to the phase of the dispersed pulse in the example of FIG. 9 according to the present invention.

Optionally, if noise with identifiable frequencies can be identified from the intensity data, to obtain cleaner lines in a graph of $Ia_i$ and $Ib_i$, the $Ia_i$ and $Ib_i$ data can be filtered. However, this filtration step is not required for the pulse-characterization technique of the present invention to work. In the present example, Fourier transform was performed on the intensity data of $Ia_i$, $Ib_i$ and $If_i$. Because we started with a known input pulse and the characteristics of the disperser was known, and furthermore it is known that the detector was not able to respond to very high frequencies, it was determined from the Fourier transform result that there was noise in the higher frequency range. The data were filtered to remove the higher frequencies with a selected filter width and a selected filter limit in the frequency domain unit, j. The corresponding points in cos $\Delta\phi_i$ were determined according to Eq. (8). In FIG. 10, curve 318 shows as a continuous curve cos $\Delta\phi_i$ derived from the $Ia_i$ and $Ib_i$ data by interpolation.

Figure 11:
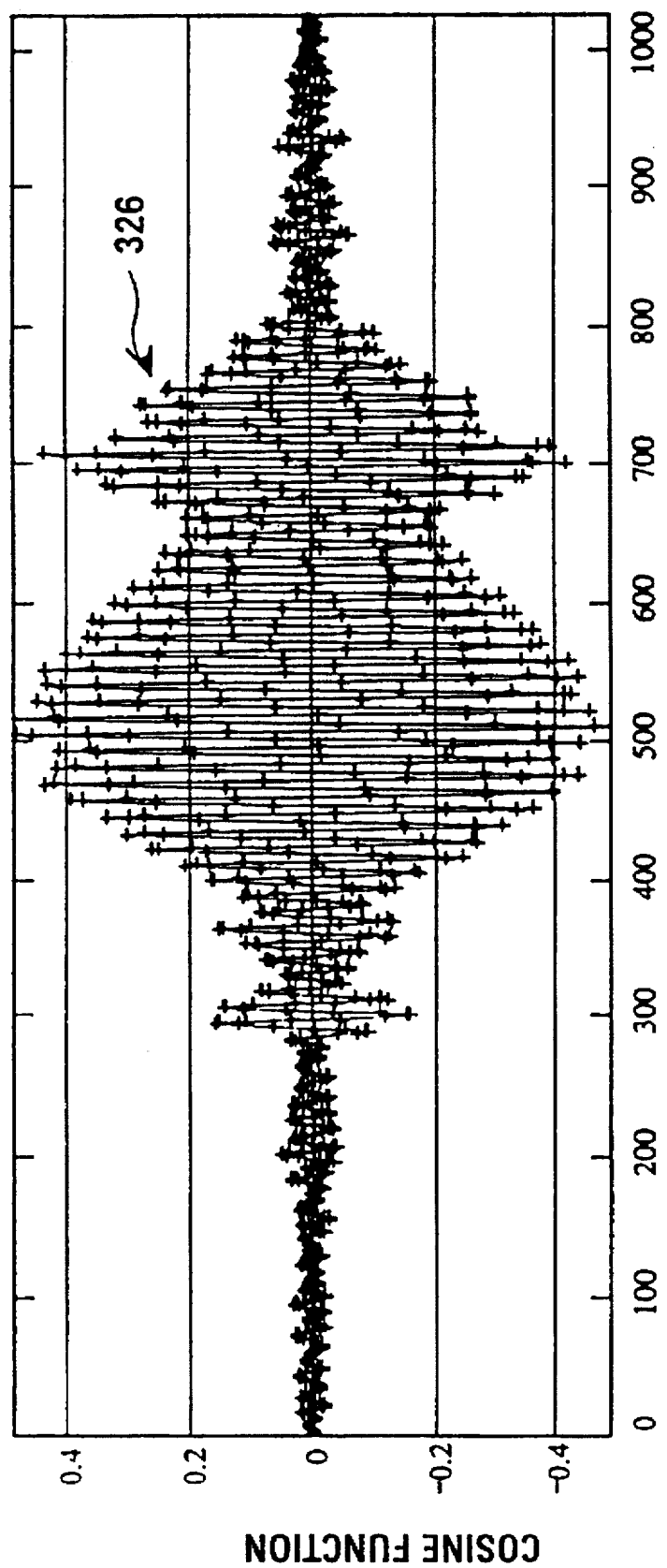
FIG. 11 shows the data of the cosine functions of FIG. 10 after removal of a constant bias to center along the abscissa.

Fourier transform was then performed on the cos $\Delta\phi_i$ data. The result showed that there was only one major frequency peak, indicating that the pulse had mainly a linear chirp or frequency sweep, i.e., the frequency characteristics in the pulse had a constant change with time. Since it is known that cosine functions cross the abscissa evenly, to facilitate understanding, the cosine function data points, i.e., cos $\Delta\phi_i$ derived from the filtered data of $Ia_i$ and $Ib_i$, were filtered to remove a bias such that the amplitude of the cos $\Delta\phi_i$ curve centers along the abscissa that intersects the origin. However, it is to be understood that this filtration step is also optional. Again, if noise of identifiable frequencies is found, it can be filtered if desired. In FIG. 11, curve 326 shows the filtered cos $\Delta\phi_i$. On curve 326, the +'s represent points derived from filtered data points.

Figure 12:
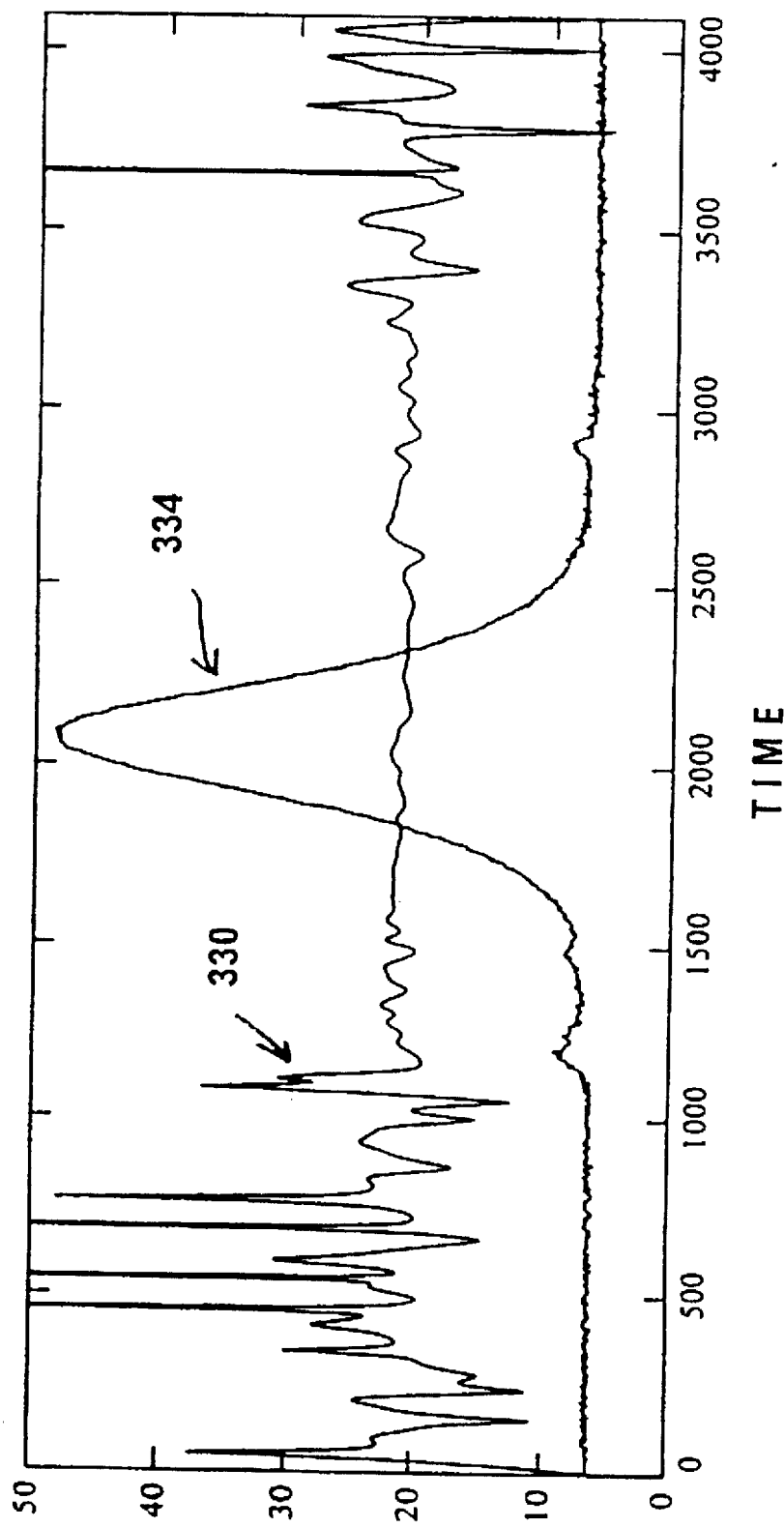
FIG. 12 shows the frequency sweep and intensities of one portion, (a), in the example of FIG. 9.

An analytic function (see "Time-Frequency Distributions—A Review" by Leon Cohen, Proceedings of IEEE Vol. 77 No. 7, July 1989) was used to determine the instantaneous frequency associated with each data point on the curve of FIG. 11. Alternatively, the frequencies can be found by curve-fitting to determine each zero-crossing point. The results are shown in FIG. 12, in which the curve 330 represents the instantaneous frequencies in GHz of the frequency variation across portion (a) of the dispersed pulse and curve 334 represents the intensities for $Ia_i$ as functions of time, which is in picoseconds.

Figure 13:
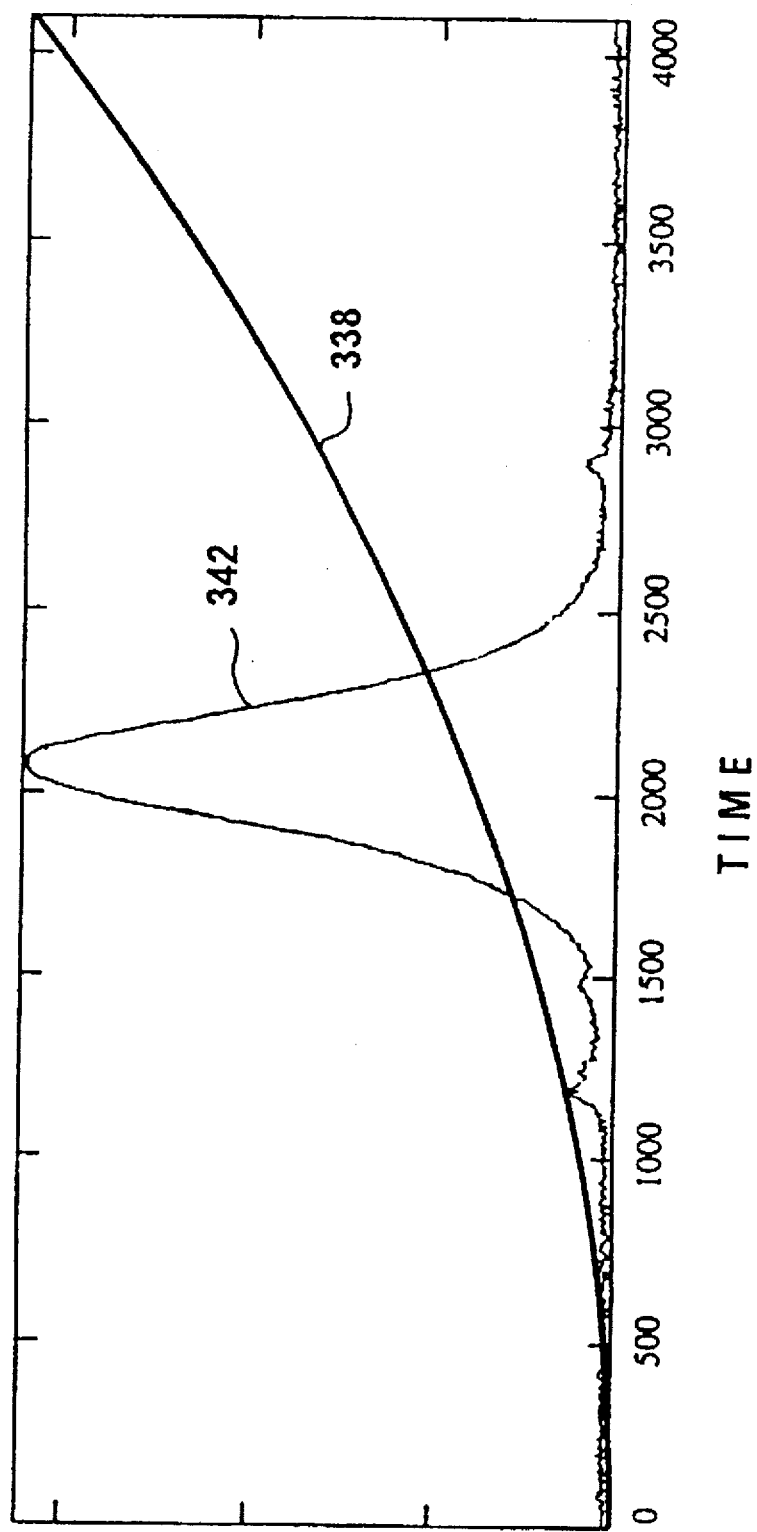
FIG. 13 shows the intensities and phase characteristics of portion (a) in the example of FIG. 9.

Using Eqs. (9) and (10), the phase values were calculated for portion (a) of the split pulse data, $Ia_i$. In FIG. 13, curve 338 shows the phase data and curve 342 shows the intensity data of portion (a) of the dispersed pulse as functions of time. The electric field and intensity data were obtained using Eqs. (11) and (12). The phase values are expressed in radians. FIG. 13 clearly shows that the phase in the dispersed pulse changes continuously with time.

Figure 14:
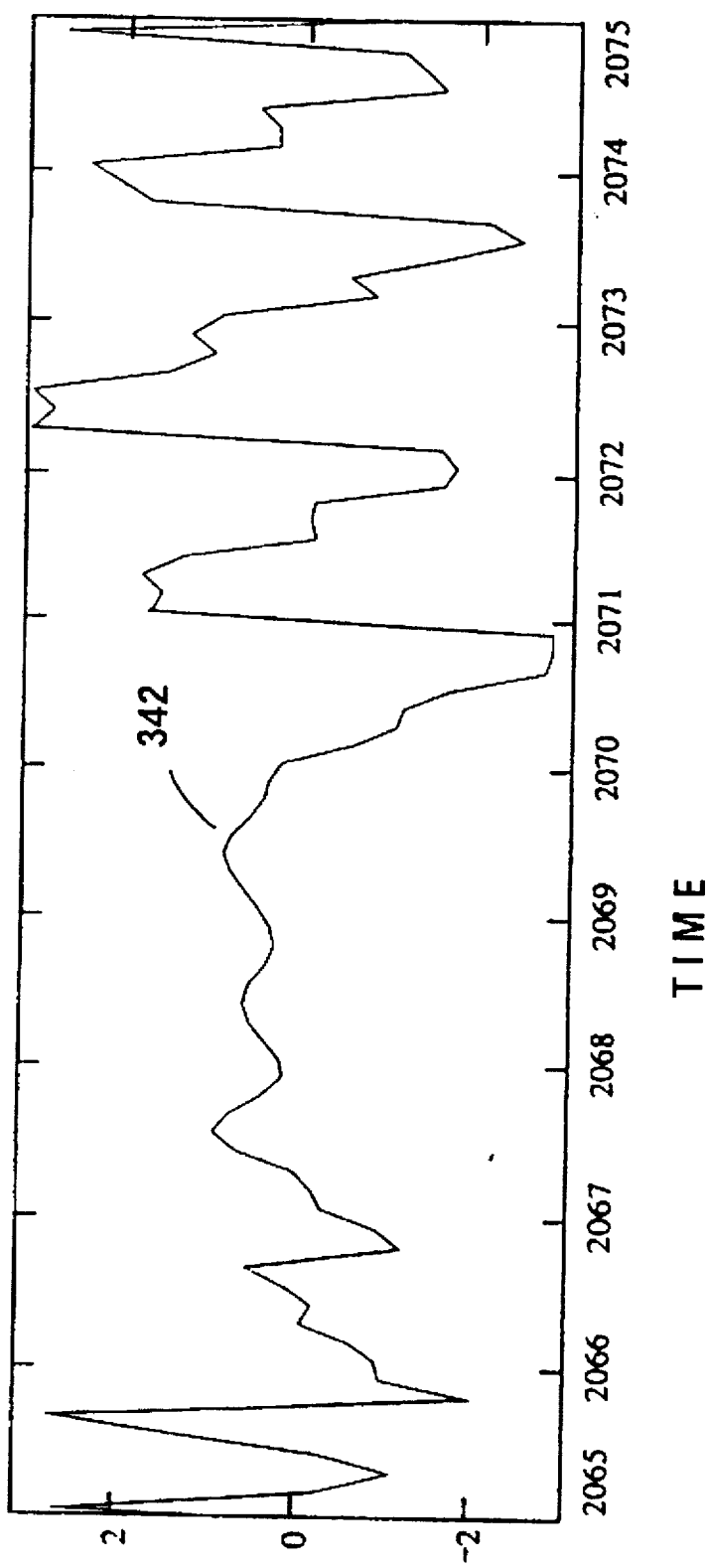
FIG. 14 shows the phase characteristics of the input pulse in the example of FIG. 9.
Figure 15:
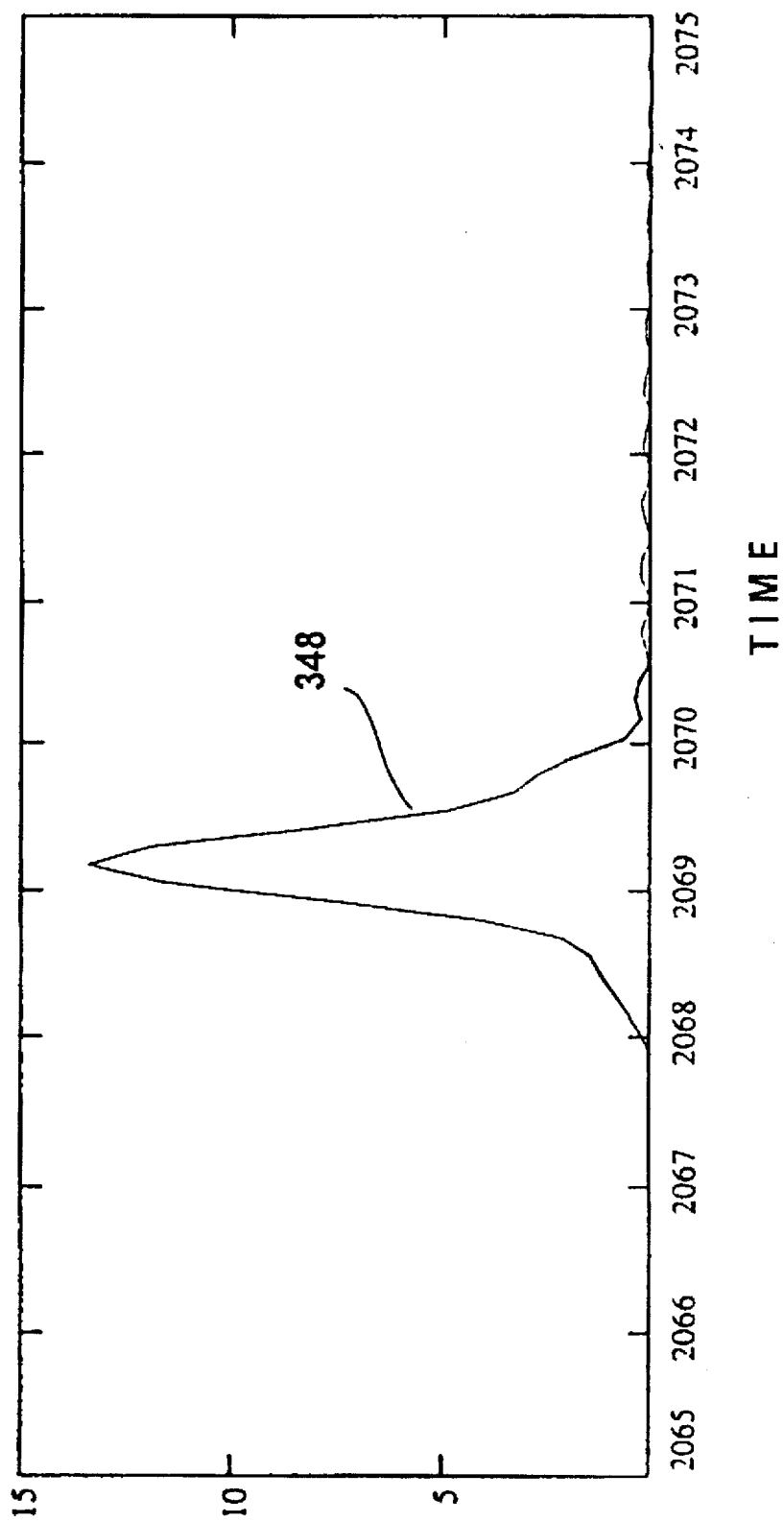
FIG. 15 shows the intensity of the input pulse in the example of FIG. 9.

Based on the intensity and the phase data of the portion (a) of the split pulse, the electric field of the dispersed pulse was determined. It is to be understood the electric field could have been determined equally well from the intensity and the phase data of portion (b). The resulting dispersed pulse was then mathematically back-propagated through the disperser (optical fiber) with the following method. The electric field of the dispersed pulse was given by Eq. (11). $E_{disp}(t)$ is represented discrete-numerically by $E_{disp}(i)$. A Fourier transform was done on $E_{disp}(i)$ to obtain $E_{disp}(v)$ in the frequency domain. The characteristics of the input pulse was then determined by performing the operation of Eq. (6), $E_{in}(v) = H^{-1}(v) \cdot E_{disp}(v)$. Taking the inverse Fourier transform of $E_{in}(v)$, the $E_{in}(i)$ values were found. Curve 342 in FIG. 14 shows the phase characteristics and curve 348 in FIG. 15 shows the intensity characteristics of the input pulse $E_{in}(i)$, respectively. The phase is in radians and the x-axis is time in picoseconds. In FIG. 15, as previously stated, the optical intensity is in an arbitrary unit and time is in picoseconds. In the present example, the transfer function representing the dispersing characteristics of the optical fiber disperser was not known with high precision. The imprecision of the transfer function may result in artifacts in the phase curve in FIG. 14. To reduce such artifacts, a disperser can be selected and carefully evaluated to determine its transfer function with high precision.

Using the technique of the present invention, very short optical pulses can be characterized. In fact, this technique can be used to characterize the shortest optical pulses currently technically feasible. Although the illustrative embodiments of the method and device of the present invention have been described in detail, it is to be understood that the above-described embodiments can be modified by one skilled in the art without departing from the scope of the invention. It is noted that the above example is given for illustrative purpose only. A person skilled in the art will be able to apply the techniques in the various embodiments described in this disclosure to analyze optical pulses.

What is claimed is:

1. An apparatus for characterizing an optical pulse, the apparatus comprising:
(a) optical disperser means for temporally dispersing the optical pulse to generate a dispersed pulse, the dispersed pulse having an intensity and a phase, the intensity and the phase having a temporal variation; and
(b) analyzer means for receiving the dispersed pulse, for generating data representing the temporal variation of the intensity and the phase of the dispersed pulse, and for calculating from the data a back propagation of the dispersed pulse through the optical disperser means to determine characteristics of the optical pulse, the analyzer means having too slow an impulse response to determine the characteristics of the optical pulse directly.

2. The apparatus according to claim 1 wherein the optical disperser means is linear in that no new frequencies are generated by the optical disperser means.

3. The apparatus according to claim 1 wherein the analyzer means comprises an optical discriminator that splits the dispersed pulse into two portions going on two paths and collimating the two portions to result in an interference pulse having optical interference between the two portions of the split pulse.

4. The apparatus according to claim 3 wherein the optical discriminator is an optical delay line discriminator including two optical fibers.

5. The apparatus according to claim 4 wherein the two optical fibers are of unequal length.

6. The apparatus according to claim 3 wherein the optical discriminator includes a beam splitter and mirrors such that the dispersed pulse is split onto paths of unequal length.

7. The apparatus according to claim 1 wherein the optical disperser means is an optical fiber.

8. The apparatus according to claim 1 wherein the optical disperser means includes a pair of prisms for spreading the optical input pulse temporally.

9. The apparatus according to claim 1 wherein the optical disperser means includes a pair of diffraction grating for spreading the optical input pulse temporally.

10. The apparatus according to claim 1 wherein the analyzer means includes a detector for generating an electrical signal in response to the dispersed pulse.

11. The apparatus according to claim 3 wherein the analyzer means includes a processor that is adapted to compute the phase relationship of the two portions of the split pulse as $\Delta \phi_i = \cos^{-1} \{If_i - Ia_i - Ib_i\}/\{2(Ib_i \cdot Ia_i)^{1/2}\}$, wherein If is the intensity of the interference pulse, Ia is the intensity of a first portion of the split pulse, Ib is the intensity of a second portion of the split pulse, and i is an integer corresponding to time in the dispersed pulse.

12. The apparatus according to claim 1 wherein the analyzer means includes a detector for detecting the intensity of light exiting the optical disperser means, a delay line discriminator to result in interference, and further includes a computer that is adapted to compute characteristics of the dispersed pulse and to calculate characteristics of the input pulse by calculating back propagation of the dispersed pulse through the optical disperser means.

13. A method for characterizing an optical input pulse, comprising the steps of:
(a) dispersing the optical input pulse temporally according to known dispersion characteristics to generate a dispersed pulse, the characteristics of the dispersing step being known such that back propagation of the dispersing step can be calculated;
(b) analyzing the intensity and phase characteristics of the dispersed pulse; and
(c) calculating from the intensity and phase characteristics of the dispersed pulse the back-propagation of the dispersed pulse through the dispersion characteristics used in the dispersing step to obtain the optical characteristics of the optical input pulse.

14. The method according to claim 13 wherein in the step of dispersing the dispersion characteristics are linear in that no new frequencies are generated by the dispersion.

15. The method according to claim 13 wherein the analyzing step includes splitting the dispersed pulse into a first portion and a second portion on two paths and collimating the two portions to result in interference between the two portions.

16. The method according to claim 15 wherein the splitting step includes splitting the dispersed pulse between two optical fibers of unequal length.

17. The method according to claim 15 wherein the splitting step includes splitting the dispersed pulse with a beam splitter onto the two paths of unequal length and directing the paths of the split pulse with mirrors.

18. The method according to claim 15 wherein the dispersing step is done by passing the optical input pulse through an optical fiber to disperse the input pulse temporally.

19. The method according to claim 15 wherein the analyzing step includes computing the phase relationship of the two portions of the split pulse as $\Delta\phi_i = \cos^{-1}\{If_i - Ia_i - Ib_i\}/\{2(Ib_i \cdot Ia_i)^{1/2}\}$, where If is the intensity of the interference pulse, Ia is the intensity of the first portion of the split pulse, Ib is the intensity of the second portion of the split pulse, and i is an integer corresponding to time in the dispersed pulse.

20. An apparatus for characterizing an optical pulse, comprising:

(a) an optical fiber for linearly temporally dispersing the optical pulse to generate a dispersed pulse, the dispersed pulse having an intensity and a phase, the intensity and the phase having a temporal variation;

(b) analyzer for receiving the dispersed pulse, for generating data representing the temporal variation of the intensity and the phase of the dispersed pulse, and for calculating from the data a back propagation of the dispersed pulse through the optical fiber to determine characteristics of the optical pulse, the analyzer having too slow an impulse response to determine the characteristics of the optical pulse directly, the analyzer including (i) an optical delay line discriminator having two paths of unequal length to split the dispersed pulse into a first portion and a second portion with a phase difference and collimating said portions to result in a collimated pulse with optical interference;

(ii) a detector for measuring intensity variations of the collimated pulse and the first and second portions; and (iii) a computer that is adapted to compute the phase difference between said portions of the split dispersed pulse as $\Delta\phi(t) = \cos^{-1}\{If(t) - Ia(t) - Ib(t)\}/\{2(Ib(t) \cdot Ia(t))^{1/2}\}$, where If is the intensity of the collimated pulse with interference, Ia is the intensity of the first portion of the split pulse, Ib is the intensity of the second portion of the split pulse, and t is time.

* * * * *